(12) United States Patent
Zhang et al.

(10) Patent No.: US 12,040,606 B2
(45) Date of Patent: Jul. 16, 2024

(54) RESISTIVE SUB-MODULE HYBRID MMC AND DIRECT CURRENT FAULT PROCESSING STRATEGY THEREOF

(71) Applicant: ZHEJIANG UNIVERSITY, Zhejiang (CN)

(72) Inventors: Zheren Zhang, Hangzhou (CN); Zheng Xu, Hangzhou (CN); Yuzhe Xu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 421 days.

(21) Appl. No.: 17/399,740

(22) Filed: Aug. 11, 2021

(65) Prior Publication Data

US 2021/0376594 A1 Dec. 2, 2021

Related U.S. Application Data

(63) Continuation of application No. PCT/CN2020/121131, filed on Oct. 15, 2020.

(30) Foreign Application Priority Data

Apr. 1, 2020 (CN) .......................... 202010252785.7

(51) Int. Cl.
*H02H 7/00* (2006.01)
*H02H 1/00* (2006.01)
(Continued)

(52) U.S. Cl.
CPC ........ *H02H 7/1216* (2013.01); *H02H 1/0007* (2013.01); *H02J 3/36* (2013.01)

(58) Field of Classification Search
None
See application file for complete search history.

(56) References Cited

U.S. PATENT DOCUMENTS

2020/0007028 A1 1/2020 Hong et al.
2021/0382103 A1* 12/2021 Rajapakse ............ G01R 31/085

FOREIGN PATENT DOCUMENTS

CN 104767185 A 7/2015
CN 105977954 A 9/2016
(Continued)

OTHER PUBLICATIONS

Yuzhe Xu et al. "Control Strategy for Hybrid HVDC Transmission System Based on LCC and Hybrid MMC", Guangdong Electric Power, vol. 31 No. Aug. 9, 2018.
(Continued)

*Primary Examiner* — Stephen W Jackson
(74) *Attorney, Agent, or Firm* — Harness, Dickey & Pierce, P.L.C.

(57) ABSTRACT

The present disclosure discloses a resistive sub-module hybrid MMC and a direct current fault processing strategy thereof. The hybrid MMC prevents fault current from entering a direct current system from the alternating current side by artificially creating three-phase earthing short circuit on the alternating current side of a converter during the direct current fault processing process, and can reduce the number of required power electronic devices compared with the module hybrid MMC. At the same time, the direct current fault processing speed of the hybrid MMC is fast, and the duration of the artificially creating three-phase short circuit fault in the fault processing process is less than 60 ms, which will not have a great impact on the alternating current system. The present disclosure greatly reduces the cost of building an overhead line high-voltage flexible direct current transmission system, and has very strong reference significance and use value in engineering.

11 Claims, 5 Drawing Sheets

(51) Int. Cl.
*H02H 7/12* (2006.01)
*H02J 3/36* (2006.01)

(56) References Cited

FOREIGN PATENT DOCUMENTS

| CN | 106712536 A | 5/2017 |
| CN | 109510179 A | 3/2019 |
| CN | 109617439 A | 4/2019 |
| CN | 110867884 A | 3/2020 |
| CN | 111327216 A | 6/2020 |

OTHER PUBLICATIONS

First Office Action issued in Chinese Priority Application 202010252785.7 mailed Nov. 18, 2020.
International Search Report (Chinese) of the International Searching Authority issued in PCT/CN2020/121131, mailed Jan. 20, 2021; ISA/CN.

* cited by examiner

RESISTIVE SUB-MODULE HYBRID MMC AND DIRECT CURRENT FAULT PROCESSING STRATEGY THEREOF

CROSS REFERENCE TO RELATED APPLICATION(S)

This application claims the priority of the Chinese patent application filed in China National Intellectual Property Administration on Apr. 1, 2020, with the Application NO. 202010252785.7 and entitled as "RESISTIVE SUB-MODULE HYBRID MMC AND DIRECT CURRENT FAULT PROCESSING STRATEGY THEREOF", the entire content of which is incorporated in this application by reference.

TECHNICAL FIELD

The present disclosure relates to the technical field of power electronics, in particular to a resistive sub-module hybrid MMC and a direct current fault processing strategy thereof.

BACKGROUND ART

With the vigorous development of power electronics technology, high voltage direct current (HVDC) technology based on modular multilevel converter (MMC) is attracting more and more attention. The MMC has the following advantages: (1) a modular design is used, the requirement for dynamic voltage sharing and trigger consistency of switching devices is low, and it is convenient to operate and maintain; (2) the scalability is good, and in theory, the voltage level can be improved by increasing the number of cascaded sub-modules; (3) the loss is low, which is close to the level of traditional direct current transmission (about 1%); (4) the harmonic content of output waveform is low, and there is no need to install a filtering device. At present, the MMC has become the most promising converter topology in high voltage direct current transmission.

The MMC, with its technical advantages over two-level and three-level converters, shows great potential in multi-terminal direct current transmission system. However, up to now, the key problems such as quick clearing of faults at the direct current side have not been solved well, which greatly limits the application of the MMC technology in overhead lines. In view of the shortcomings of the method of dealing with direct current side faults by tripping alternating current circuit breakers in the current MMC-HVDC project, there are currently two improvement measures with high technical maturity: (1) converters based on half-bridge sub-modules are still used, and high-voltage direct current circuit breakers are installed at both ends of direct current lines, which can quickly turn on the fault lines by the high-voltage direct current circuit breakers. At the end of 2013, ABB company released a high voltage direct current circuit breaker with rated voltage of 320 kV, which can turn on direct current with maximum value of 9 kA within 5 ms. At present, SIEMENS, ALSTOM and Smart Grid Research Institute of State Grid are also developing their own high-voltage direct current circuit breakers. (2) The converter with direct current fault self-cleaning capability can quickly deal with direct current line faults.

The first method adopts the scheme of a modular multi-level converter (MMC) plus a direct current circuit breaker based on half-bridge sub-module, which is suitable for direct current power grid with any number of terminals. The second network construction method adopts the MMC with direct current fault self-clearing capability, such as the MMC based on a full-bridge sub-module, but does not need a direct current circuit breaker. This network construction method is suitable for small-scale direct current power grid with less than 10 terminals. When a half-bridge sub-module MMC plus a direct current circuit breaker is used, the converter station is usually required to continue to operate during direct current line fault and cannot be locked. The fault line is quickly removed by a direct current circuit breaker, and its fault processing principle is similar to that of alternating current power grid. When the network construction mode without a direct current circuit breaker is used, the relevant converters in the network are locked during the direct current line fault, the fault current reaches zero and stabilizes at zero value at about 10 ms after being locked, and then the fault line is isolated by an isolating switch. Then the relevant converters are unlocked to resume power transmission. The time from fault start to power transmission recovery is generally about 20 ms, and the impact on alternating current power grid is usually within an acceptable range.

When a half-bridge sub-module MMC and a direct current circuit breaker are used to form direct current power grid, the direct current circuit breaker becomes the key component of direct current power grid. At present, the construction schemes of high-voltage direct current circuit breakers mainly focus on three types, namely, a traditional mechanical circuit breaker based on conventional switches, a solid-state circuit breaker based on pure power electronic devices and a hybrid circuit breaker based on their combination. Although technically feasible high-voltage direct current circuit breakers have been developed at present, they are too expensive and bulky to be widely used in power grid like alternating current circuit breakers.

When the MMC with direct current fault self-clearing capability is used to construct direct current power grid, taking the full-bridge sub-module as an example, compared with the half-bridge sub-module MMC with the same capacity and voltage level, the number of power electronic devices used by the full-bridge MMC is almost twice that, which not only increases the investment cost, but also introduces more operating losses. Therefore, some literatures have proposed a sub-module hybrid MMC converter station consisted of a half-bridge sub-module and a full-bridge sub-module, which not only has the capability of direct current fault processing, but also reduces the number of power electronic devices and operating losses to a certain extent compared with a full-bridge MMC. However, in order to meet the demand of direct current fault processing speed, it is usually required that the number of full-bridge sub-modules in the hybrid sub-module accounts for more than 50% of all sub-modules, and even reaches 75% in existing practical projects, which greatly weakens the advantages of a hybrid sub-module MMC over a full-bridge MMC, and increases the construction cost and operation loss.

SUMMARY

Therefore, the purpose of the present disclosure is to provide a resistive sub-module hybrid MMC and a direct current fault processing strategy thereof. The ratio of resistive sub-modules required by the hybrid MMC is only 30% of all half-bridge sub-modules, and direct current faults can be isolated within 50 ms, which greatly reduces the cost of building an overhead line high-voltage flexible direct current transmission system, and has very strong reference significance and use value in engineering.

In order to achieve the above purpose, the present disclosure provides a resistive sub-module hybrid MMC, which is a three-phase six-bridge arm structure, wherein each phase comprises an upper bridge arm and a lower bridge arm, wherein the upper bridge arm comprising $N_1$ half-bridge arm sub-modules, $N_2$ resistive sub-modules and a bridge arm reactor in series from the high voltage terminal to the low voltage terminal; the lower bridge arm comprising a bridge arm reactor, $N_2$ resistive sub-modules and $N_1$ half-bridge sub-modules in series from the high voltage terminal to the low voltage terminal, where $N_1$ and $N_2$ are natural numbers greater than 1;

the middle node of the upper bridge arm and the lower bridge arm of phase A is connected with an alternating current breaker $BR_1$, and the other end of the alternating current breaker $BR_1$ is grounded; the middle node of the upper bridge arm and the lower bridge arm of phase B is connected with an alternating current breaker $BR_2$, and the other end of the alternating current breaker $BR_2$ is grounded; the middle node of the upper bridge arm and the lower bridge arm of phase C is connected with an alternating current breaker $BR_3$, and the other end of the alternating current breaker $BR_3$ is grounded.

Preferably, the number $N_2$ of resistive sub-modules in each bridge arm is less than or equal to 30% of $N_1$.

Preferably, the high voltage terminal of the direct current side of the MMC is connected with the direct current line through a smoothing reactor and a quick mechanical switch in sequence.

Preferably, the resistive sub-module comprises two IGBT $T_1$-$T_2$ with anti-parallel diodes and a resistor $R_0$, wherein the emitter of the IGBT $T_1$ is connected with the collector of the IGBT $T_2$ and serves as the high voltage terminal of the sub-module, the collector of IGBT $T_1$ is connected with one end of resistor $R_0$, and the other end of resistor $R_0$ is connected with the emitter of the IGBT $T_2$ and serves as the low voltage terminal of the sub-module.

The present disclosure further discloses a direct current fault processing strategy applied to the resistive sub-module hybrid MMC described above, wherein the direct current fault processing strategy comprises the following steps:

(1) during normal operation, keeping the alternating current circuit breakers $BR_1$, $BR_2$ and $BR_3$ of the MMC in open state, keeping the quick mechanical switches in closed state, keeping all resistive sub-modules in bypass state, and monitoring the bridge arm current of each bridge arm of the MMC at the same time;

(2) after the direct current fault occurs, if the converter station where the MMC is located first detects that the bridge arm current exceeds the threshold, immediately locking all half-bridge sub-modules in the MMC and conducting all resistive sub-modules, closing alternating current circuit breakers $BR_1$, $BR_2$ and $BR_3$ at the same time, and then sending a direct current fault processing instruction to the converter station at the other end connected with the MMC;

(3) when the converter station at the other end receives the direct current fault processing instruction or detects that the current of its own MMC bridge arm exceeds the threshold, similarly, immediately locking all half-bridge sub-modules in the MMC and conducting all resistive sub-modules, and closing the alternating current circuit breakers $BR_1$, $BR_2$ and $BR_3$;

(4) after a certain period of time $t_3$, when the current flowing through the quick mechanical switches at both ends of the fault line is reduced to a certain size, the converter stations at both ends issuing an opening signal to their respective quick mechanical switches, the quick mechanical switches complete turning on to realize the physical isolation of the fault line, and at the same time, the converter stations at both ends issuing an opening signal to the alternating current circuit breakers $BR_1$, $BR_2$ and $BR_3$ of their respective MMC;

(5) after a certain time $t_4$, the alternating current circuit breakers $BR_1$, $BR_2$ and $BR_3$ of the MMC at both ends returning to the open state, and completing the direct current fault processing.

Preferably, in step (2) and step (3), it is determined that the MMC bridge arm current exceeds the threshold when the following relation holds;

$$\max(I_{pa}, I_{na}, I_{pb}, I_{nb}, I_{pc}, I_{nc}) > 2I_{rate}$$

where $I_{pa}$ is the upper arm current of phase A of the MMC, $I_{na}$ is the lower arm current of phase A of the MMC, $I_{pb}$ is the upper arm current of phase B of the MMC, $I_{nb}$ is the lower arm current of phase B of the MMC, $I_{pc}$ is the upper arm current of phase C of the MMC, $I_{nc}$ is the lower arm current of phase C of the MMC, $I_{rate}$ is rated current of IGBT in the sub-module.

Preferably, in step (5), reclosing operation is required after direct current fault processing is completed, and the specific implementation method is as follows:

for a temporary direct current fault, after a certain de-ionization time, issuing a closing signal to the quick mechanical switches at both ends of the fault line, and at the same time, issuing an instruction to unlock the half-bridge sub-module and bypass the resistive sub-module to the MMC at both ends, so that the system can recover to the steady-state operation state;

for a permanent direct current fault, after a certain de-ionization time, issuing a closing signal to the quick mechanical switches at both ends of the fault line, and at the same time, issuing an instruction to unlock the half-bridge sub-module and bypass the resistive sub-module to the MMC at both ends; as it is a permanent direct current fault, if it is detected again that the bridge arm current of the MMC of a converter station at one end exceeds the threshold after a certain time, performing the direct current fault processing again according to steps (2)~(5).

Preferably, when the half-bridge sub-module in the MMC is locked and the resistive sub-module is put into operation, the resistor in the resistive sub-module forms an LC oscillation attenuation loop together with the smoothing reactor, the bridge arm reactor and the direct current line, so that the direct current fault current quickly drops to the current range that the quick mechanical switch is capable of being turned off within $t_3$ after the half-bridge sub-module is locked and the resistive sub-module is put into operation, and finally the quick mechanical switch is turned on.

Preferably, during the $t_3+t_4$ period of fault processing, three-phase inter-phase short circuit is actively created on the MMC valve side by closing the alternating current circuit breakers $BR_1$, $BR_2$ and $BR_3$, which prevents the current of the alternating current system from flowing into the direct current system and accelerates the process of fault current oscillation attenuation, and the total duration of $t_3+t_4$ does not exceed 60 ms.

According to the specific embodiment provided by the present disclosure, the present disclosure discloses the following technical effects.

1. The ratio of the resistive sub-module hybrid MMC provided by the present disclosure is only 30% of all half-bridge sub-modules, which can reduce the number of required power electronic devices and greatly reduce the construction cost of converter stations compared with the sub-module hybrid MMC.

2. The resistive sub-module hybrid MMC provided by the present disclosure is in a bypass state under normal operating state, which can greatly reduce the operating loss compared with the existing hybrid MMC.

BRIEF DESCRIPTION OF THE DRAWINGS

In order to explain the embodiments of the present disclosure or the technical scheme in the prior art more clearly, the drawings needed in the embodiments will be briefly introduced hereinafter. Obviously, the drawings in the following description are only some embodiments of the present disclosure. For those skilled in the art, other drawings can be obtained according to these drawings without paying creative labor.

DETAILED DESCRIPTION OF THE EMBODIMENTS

The technical scheme in the embodiments of the present disclosure will be described clearly and completely hereinafter with reference to the drawings in the embodiments of the present disclosure. Obviously, the described embodiments are some embodiments of the present disclosure, rather than all of the embodiments. Based on the embodiments of the present disclosure, all other embodiments obtained by those skilled in the art without paying creative labor belong to the scope of protection of the present disclosure.

The purpose of the present disclosure is to provide a resistive sub-module hybrid MMC and a direct current fault processing strategy thereof. The ratio of resistive sub-modules required by the hybrid MMC is only 30% of all half-bridge sub-modules, and direct current faults can be isolated within 50 ms, which greatly reduces the cost of building an overhead line high-voltage flexible direct current transmission system, and has very strong reference significance and use value in engineering.

In order to make the above objects, features and advantages of the present disclosure more obvious and understandable, the present disclosure will be further explained in detail hereinafter with reference to the drawings and specific embodiments.

Figure 1:
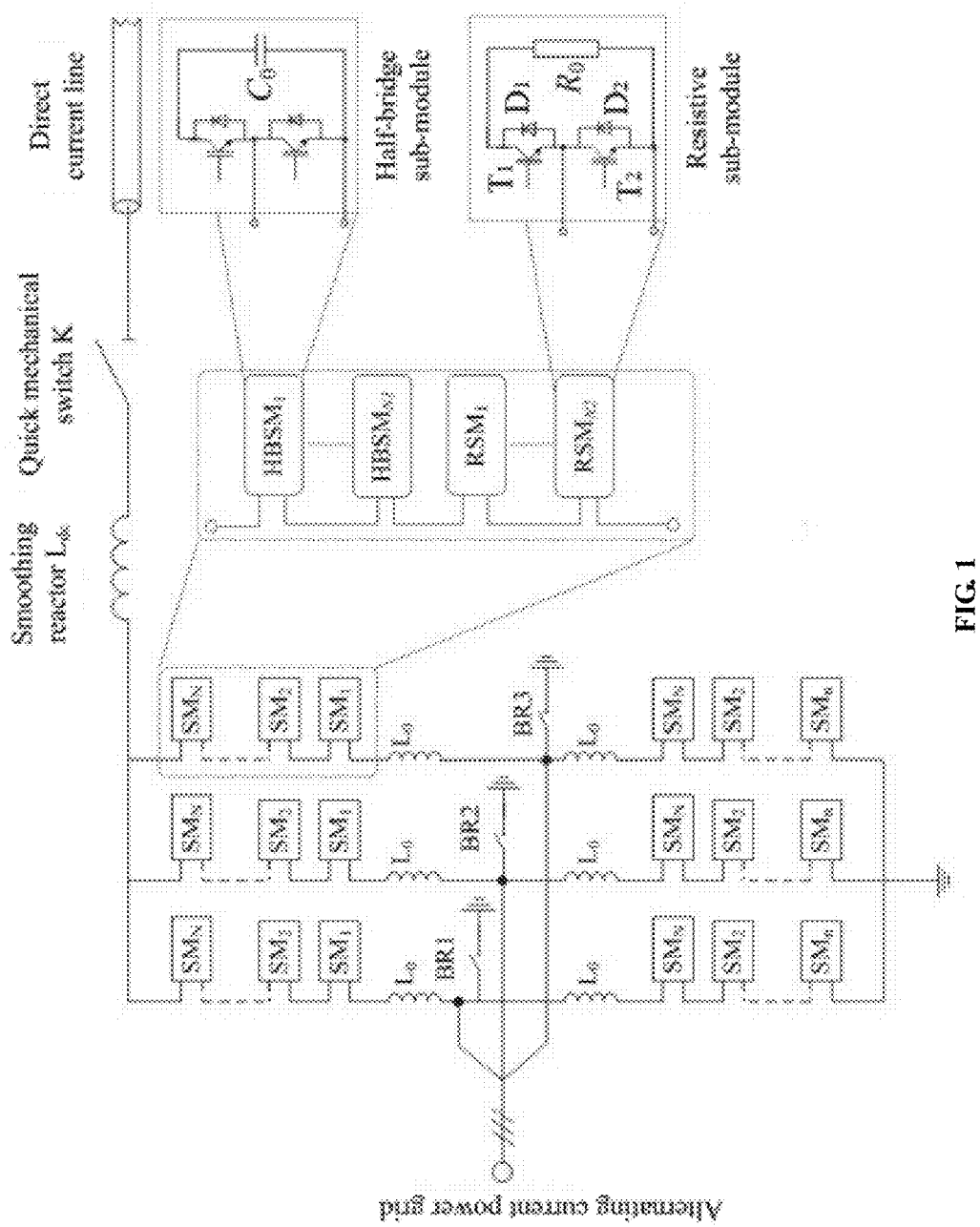
FIG. 1 is a schematic diagram of the topological structure of a resistive sub-module hybrid MMC according to the present disclosure.

FIG. 1 is a schematic diagram of the topological structure of a resistive sub-module hybrid MMC according to the present disclosure. As shown in FIG. 1, the resistive sub-module hybrid MMC of the present disclosure is a three-phase six-bridge arm structure. Each phase comprises an upper bridge arm and a lower bridge arm. Each bridge arm comprising N sub-modules $SM_n$ and a bridge arm reactor connected in series, n$\square$[1, N]. The N sub-modules $SM_n$ comprise $N_1$ half-bridge sub-modules $HBSM_{n1}$ and $N_2$ resistive sub-modules $RSM_{n2}$, i.e., $N=N_1+N_2$, where N, $N_1$ and $N_2$ are natural numbers greater than 1, n1$\square$[1, $N_1$], n2$\square$[1, $N_2$]. The outlet of the direct current side of the converter is connected with the direct current line through a smoothing reactor $L_{dc}$ and a quick mechanical switch K. $N_1$ half-bridge sub-modules connected in series, $N_2$ resistive sub-modules connected in series and a bridge arm reactor are respectively arranged in all upper bridge arms of the MMC according to the sequence from the high voltage terminal to the low voltage terminal. A bridge arm reactor, $N_2$ resistive sub-modules connected in series and $N_1$ half-bridge sub-modules connected in series are respectively arranged in all lower bridge arms of the MMC according to the sequence the high voltage terminal to the low voltage terminal. The connection points of the upper bridge arm and the lower bridge arm of phase A are grounded through an alternating current breaker $BR_1$. The connection points of the upper bridge arm and the lower bridge arm of phase B are connected through an alternating current breaker $BR_2$. The connection points of the upper bridge arm and the lower bridge arm of phase C are grounded through an alternating current breaker $BR_3$. The number $N_2$ of resistive sub-modules in each bridge arm is less than or equal to 30% of $N_1$. The structure of the resistive sub-module is similar to that of the conventional half-bridge sub-module, that is, the high voltage terminal and the low voltage terminal of the sub-module have two parallel branches, one of which comprising IGBT T1 and an anti-parallel diode D1, and the other comprising IGBT T2, an anti-parallel diode D2 and a sub-module resistance in series.

For the above hybrid MMC, the direct current fault processing strategy comprises the following steps:

(1) during normal operation, keeping $BR_1$, $BR_2$ and $BR_3$ in open state, keeping K in closed state; at the same time, the bridge arm currents of each bridge arm are monitored, which are the upper arm current $I_{pa}$ of phase A, the lower arm current $I_{na}$ of phase A, the upper arm current $I_{pb}$ of phase B, the lower arm current $I_{nb}$ of phase B, the upper arm current $I_{pc}$ of phase C, and the lower arm current $I_{nc}$ of phase C;

(2) After the direct current fault occurs, after t1 time, a converter station first detects that the current of each bridge arm satisfies the following relational expression, immediately locks all half-bridge sub-modules in the MMC and conducting all resistive sub-modules, closes alternating current switches $BR_1$, $BR_2$ and $BR_3$, and sends a locking command to other converter stations at the same time;

$$\max(I_{pa}, I_{na}, I_{pb}, I_{nb}, I_{pc}, I_{nc}) > 2I_{rate}$$

where $I_{rate}$ is rated direct current of IGBT in the sub-module;

(3) After other converter stations receives the locking signal or detects that the current of its own bridge arm exceeds the threshold, similarly, the converter stations immediately lock all half-bridge sub-modules in the MMC and conduct all resistive sub-modules, and close the alternating current switch $BR_1$, the alternating current switch $BR_2$ and the alternating current switch $BR_3$ at the same time, in which it takes time $t_2$ from the time when the first converter station is closed to the time when all converter stations in direct current network complete closing.

(4) After time $t_3$ passes after all converter stations are locked, after the current flowing through the quick mechanical switches K at both ends of the fault line is reduced to 0.2 kA, the corresponding converter station issues an opening signal to the quick mechanical switches; the quick mechanical switch completes turning on to realize the physical isolation of the fault line, and at the same time, issues an opening signal to $BR_1$, $BR_2$ and $BR_3$.

After the half-bridge sub-module in the MMC is locked and the resistive sub-module is connected, the equivalent resistor of the resistive sub-module, the smoothing reactor, the bridge arm reactor and the direct current line together form a RL attenuation loop, so that the direct current fault current quickly drops to the current range that the quick mechanical switch is capable of being turned off within $t_3$ after the half-bridge sub-module is locked and the resistive sub-module is connected, and finally the quick mechanical switch K is turned on for fault.

(5) After $t_4$ time (the longest period is half a cycle, that is, 10 ms), $BR_1$, $BR_2$ and $BR_3$ return to the open state, and the direct current fault processing is completed. During the fault processing period $t_3+t_4$, three-phase inter-phase short circuit is actively created on the converter station valve side by closing $BR_1$, $BR_2$ and $BR_3$, which prevents the current of the alternating current system from flowing into the direct current system and accelerates the process of fault current oscillating to 0, wherein the total duration of $t_3+t_4$ does not exceed 60 ms.

When the fault processing is completed, reclosing operation is required after direct current fault processing is completed, and the specific implementation mode is as follows:

for a temporary direct current fault, after de-ionization time $t_5$, issuing a closing signal to the quick mechanical switches K, and issuing an instruction to unlock the half-bridge sub-module and bypass the resistive sub-module to the MMC at both ends, so that the system can recover to the steady-state operation state;

for a permanent direct current fault, after de-ionization time $t_5$, issuing a closing signal to the quick mechanical switches K, and issuing an instruction to unlock the half-bridge sub-module and bypass the resistive sub-module to the MMC at both ends; as it is a permanent fault, if it is detected again that the bridge arm current value of a converter station exceeds the threshold after time $t_6$, processing the fault again according to the above steps.

Figure 2:
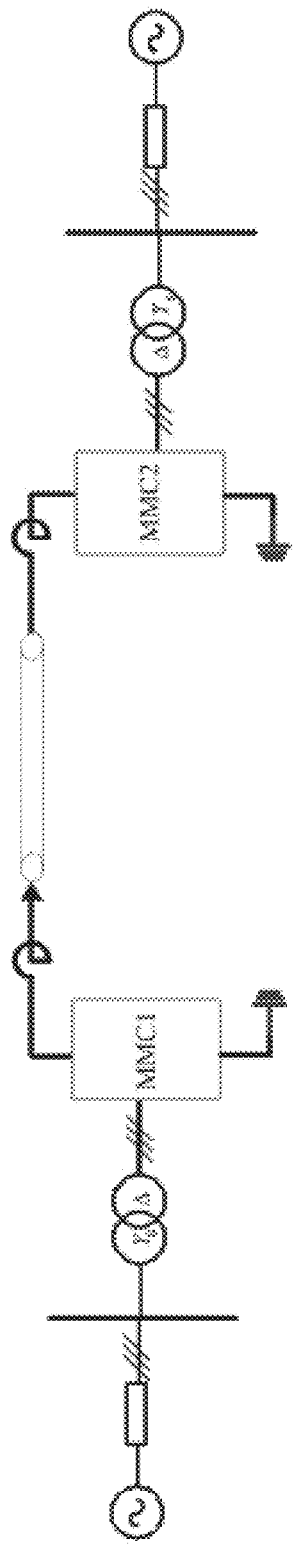
FIG. 2 is a schematic structural diagram of a test system used in a specific embodiment of the present disclosure.

In the specific embodiment of the direct current fault processing process of the two-terminal direct current transmission test system shown in FIG. 2, the converter stations on both sides adopt the resistive sub-module hybrid MMC proposed by the present disclosure, and the specific parameters are shown in table 1:

TABLE 1

| parameter | value |
|---|---|
| direct current voltage | 400 kV |
| rated power | 400 MW |
| effective value of alternating current side voltage | 230 kV |
| equivalent reactance of an alternating current system | 10 mH |
| Transformation ratio of a converter transformer | 230 kV/200 kV |
| rated capacity of a converter transformer | 480 MW |
| number of half-bridge sub-modules per bridge arm | 200 |
| number of resistive sub-modules per bridge arm | 60 |

TABLE 1-continued

| parameter | value |
|---|---|
| Sub-module capacitance $C_0$ | 6667 µF |
| Sub-module resistance $R_0$ | 0.6667 Ω |
| rated capacitance voltage of a sub-module | 2 kV |
| bridge arm reactance | 76 mH |
| line length | 100 km |
| rated current of IGBT | 1.5 kA |

Simulation scenario: in steady-state operation, the converter station MMC1 at the first side controls direct current voltage, the converter station MMC2 at the second side controls transmission power, and MMC1 transmits 400 MW active power to the MMC2. At 1.5 s, a temporary ground short circuit fault occurs at the midpoint of the direct current line, and the fault lasts for 0.1 s.

(1) After $t_1=3$ ms, the MMC1 detects that the bridge arm current exceeds the threshold 3 kA, immediately locks all half-bridge sub-modules and conducts all resistive sub-modules, closes alternating current switches $BR_1$, $BR_2$ and $BR_3$, and issues an opening signal to mechanical switches K on both sides of the line, and at the same time sends a locking command to the MMC2.

(2) After $t_2=1$ ms, the MMC2 detects that the bridge arm current exceeds the threshold 3 kA, immediately locks all half-bridge sub-modules and conducts all resistive sub-modules, and closes alternating current switches $BR_1$, $BR_2$ and $BR_3$.

(3) After $t_3=40$ ms, the fault currents flowing through the mechanical switches K on both sides of the line are all reduced to 0.2 kA, the switches on both sides completes turning on, the fault line is isolated, and the signals of turning on $BR_1$, $BR_2$ and $BR_3$ are sent to converter stations on both sides.

(4) After $t_4=10$ ms, $BR_1$, $BR_2$ and $BR_3$ of converter stations on both sides return to the open state, and the direct current fault processing is completed.

Figure 3:
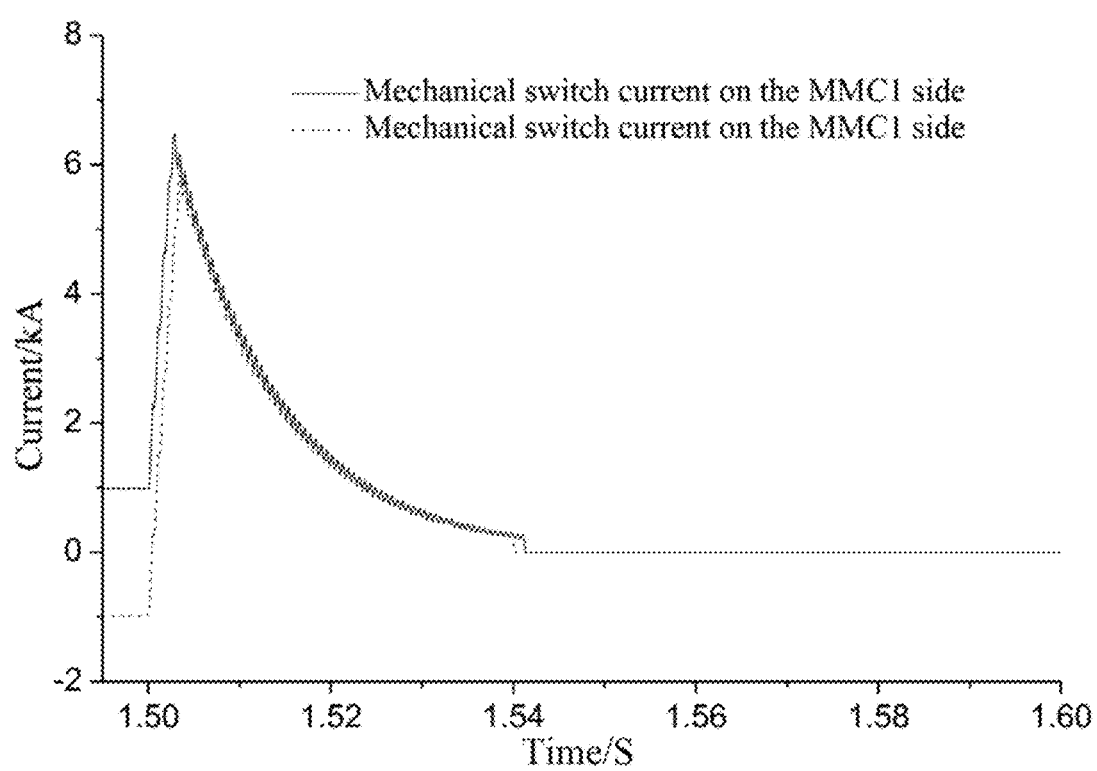
FIG. 3 is a schematic diagram of the current waveform flowing through the quick mechanical switch in the fault processing process according to the present disclosure.

The above process takes a total of 54 ms, and the fault line is successfully isolated at 1.544 s, in which the converter stations $BR_1$, $BR_2$ and $BR_3$ on both sides are closed for 51 ms, which has less impact on the alternating current system. The current waveform flowing through the mechanical switches K on both sides of the line in the process is shown in FIG. 3.

Figure 4:
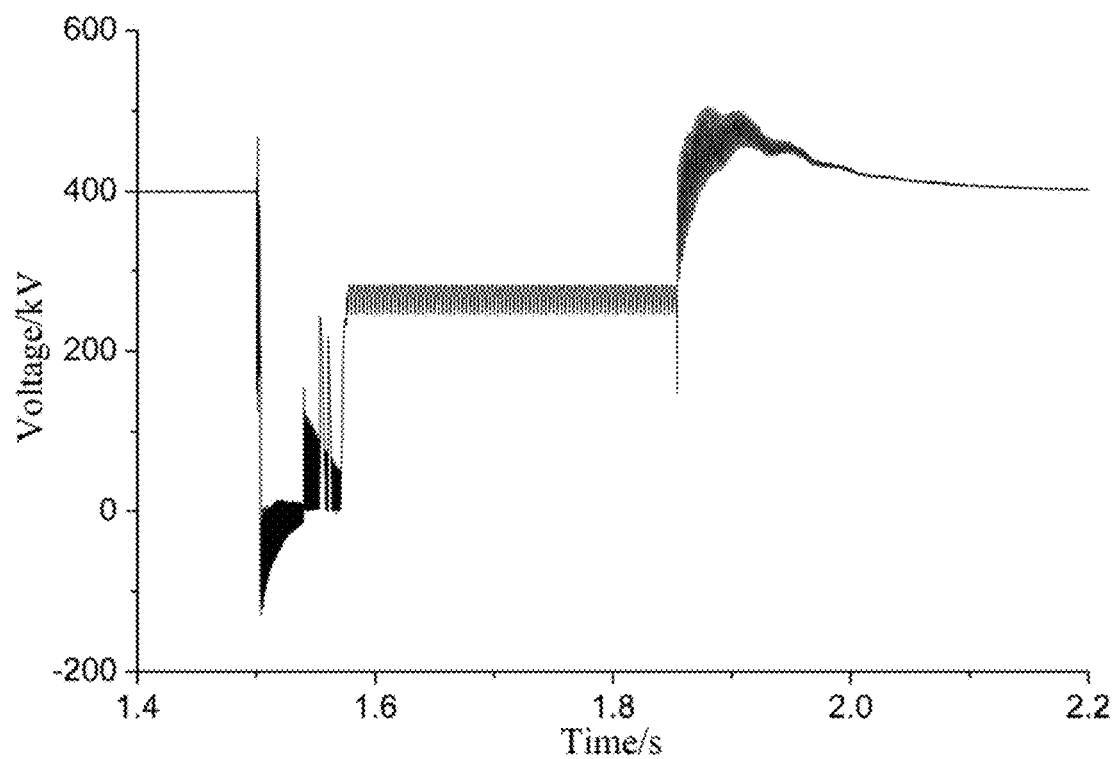
FIG. 4 is a schematic diagram of the direct current voltage waveform of the MMC1 in the fault processing process according to the present disclosure.
Figure 5:
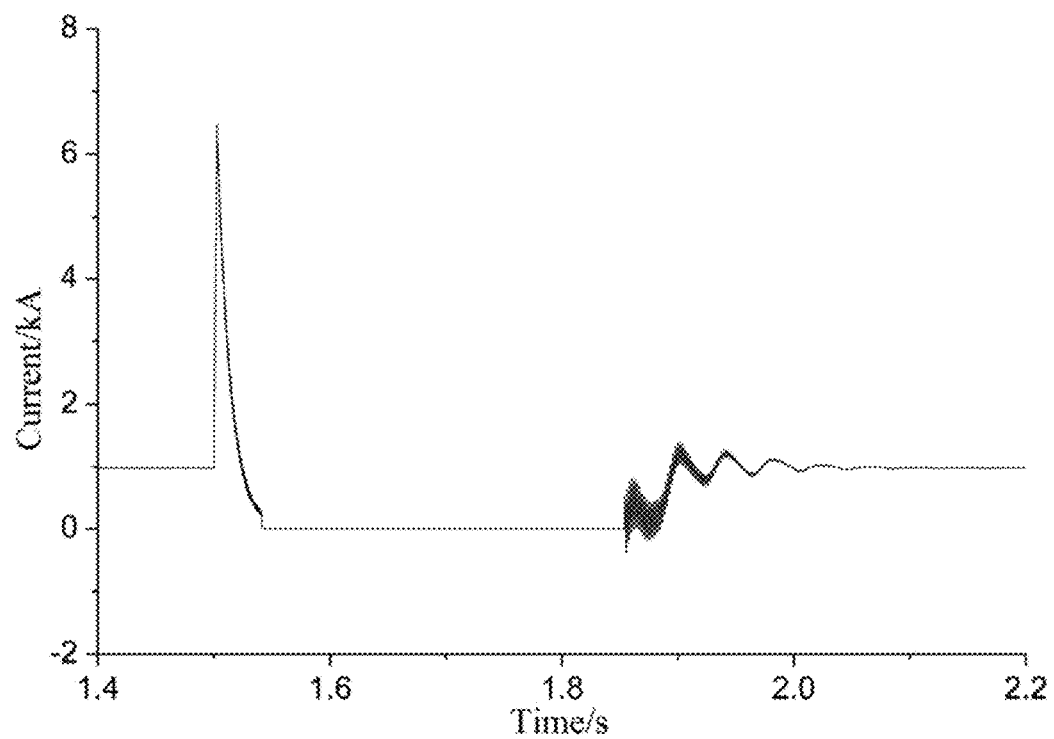
FIG. 5 is a schematic diagram of the direct current waveform of the MMC1 during fault processing according to the present disclosure.
Figure 6:
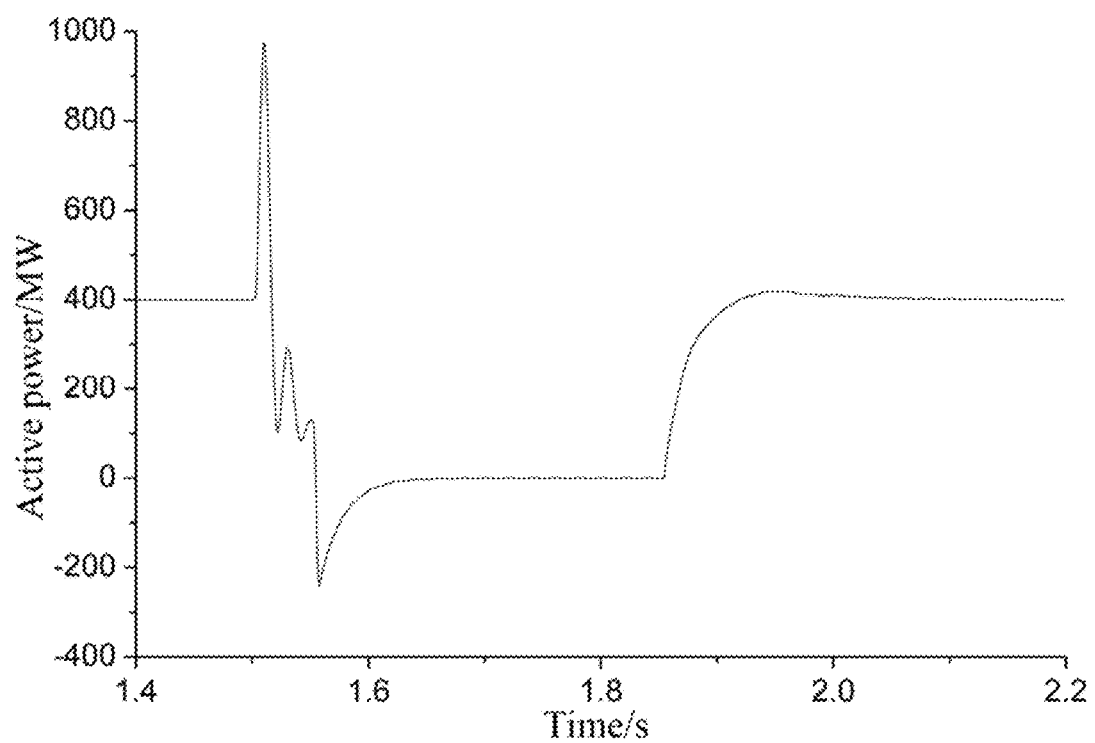
FIG. 6 is a schematic diagram of the active power waveform of the MMC1 during fault processing according to the present disclosure.

After the fault processing is completed, wait for $t_5=300$ ms for the de-ionization time, a closing signal is issued to the quick mechanical switch K, an instruction to unlock the half-bridge sub-module and bypass the resistive sub-module is issued to the MMC on both sides, and finally the system returns to the steady-state operation state. In the process from fault to recovery to steady-state operation, the direct current voltage waveform of the MMC1 is shown in FIG. 4, the direct current waveform is shown in FIG. 5, and the active power waveform transmitted to the MMC2 is shown in FIG. 6.

In this specification, each embodiment is described in a progressive manner, and each embodiment focuses on the differences from other embodiments. It is sufficient to refer to the same and similar parts among each embodiment.

In the present disclosure, a specific example is applied to illustrate the principle and implementation of the present disclosure, and the explanation of the above embodiments is only used to help understand the method and its core idea of the present disclosure. At the same time, according to the idea of the present disclosure, there will be some changes in the specific implementation and application scope for those skilled in the art. To sum up, the contents of this specification should not be construed as limiting the present disclosure.

What is claimed is:

1. A resistive sub-module hybrid modular multilevel converter (MMC) comprising:
    a three-phase six-bridge arm structure, wherein each phase comprises an upper bridge arm and a lower bridge arm, wherein the upper bridge arm comprising $N_1$ half-bridge arm sub-modules, $N_2$ resistive sub-modules and a bridge arm reactor in series from a high voltage terminal to a low voltage terminal; the lower bridge arm comprising a bridge arm reactor, $N_2$ resistive sub-modules and $N_1$ half-bridge sub-modules in series from the high voltage terminal to the low voltage terminal, where $N_1$ and $N_2$ are natural numbers greater than 1, wherein the $N_2$ resistive sub-modules in each bridge arm is less than or equal to 30% of $N_1$;
    a middle node of the upper bridge arm and the lower bridge arm of phase A is connected with a first end of an alternating current breaker $BR_1$, and a second end of the alternating current breaker $BR_1$ is grounded;
    a middle node of the upper bridge arm and the lower bridge arm of phase B is connected with a first end of an alternating current breaker $BR_2$, and a second end of the alternating current breaker $BR_2$ is grounded;
    a middle node of the upper bridge arm and the lower bridge arm of phase C is connected with a first end of an alternating current breaker $BR_3$, and a second end of the alternating current breaker $BR_3$ is grounded.

2. The resistive sub-module hybrid MMC according to claim 1, wherein the high voltage terminal of a direct current side of the MMC is connected with a direct current line through a smoothing reactor and a mechanical switch in sequence.

3. The resistive sub-module hybrid MMC according to claim 1, further comprising two IGBT $T_1$-$T_2$ with anti-parallel diodes and a resistor $R_0$, wherein an emitter of the IGBT $T_1$ is connected with a collector of the IGBT $T_2$ and serves as the high voltage terminal of the sub-module, a collector of IGBT $T_1$ is connected with a first end of resistor $R_0$, and a second end of the resistor $R_0$ is connected with the emitter of the IGBT $T_2$ and serves as the low voltage terminal of the sub-module.

4. A direct current fault processing strategy applied to a resistive sub-module hybrid modular multilevel converter (MMC), the resistive sub-module hybrid MMC comprising:
    a three-phase six-bridge arm structure, wherein each phase comprises an upper bridge arm and a lower bridge arm, wherein the upper bridge arm comprising $N_1$ half-bridge arm sub-modules, $N_2$ resistive sub-modules and a bridge arm reactor in series from a high voltage terminal to a low voltage terminal; the lower bridge arm comprising a bridge arm reactor, $N_2$ resistive sub-modules and $N_1$ half-bridge sub-modules in series from the high voltage terminal to the low voltage terminal, where $N_1$ and $N_2$ are natural numbers greater than 1;
    a middle node of the upper bridge arm and the lower bridge arm of phase A is connected with a first end of an alternating current breaker $BR_1$, and a second end of the alternating current breaker $BR_1$ is grounded; a middle node of the upper bridge arm and the lower bridge arm of phase B is connected with a first end of an alternating current breaker $BR_2$, and a second end of the alternating current breaker $BR_2$ is grounded; a middle node of the upper bridge arm and the lower bridge arm of phase C is connected with a first end of an alternating current breaker $BR_3$, and a second end of the alternating current breaker $BR_3$ is grounded;
    wherein the high voltage terminal of a direct current side of the MMC is connected with a direct current line through a smoothing reactor and a mechanical switch in sequence;
    wherein the direct current fault processing strategy comprises a method comprising the following steps:
    (1) during normal operation, keeping the alternating current circuit breakers $BR_1$, $BR_2$ and $BR_3$ of the MMC in open state, keeping the mechanical switches in closed state, keeping all resistive sub-modules in bypass state, and monitoring the bridge arm current of each bridge arm of the MMC at the same time;
    (2) after the direct current fault occurs, if a converter station where the MMC is located first detects that the bridge arm current exceeds a threshold, immediately locking all half-bridge sub-modules in the MMC and conducting all resistive sub-modules, closing alternating current circuit breakers $BR_1$, $BR_2$ and $BR_3$ at the same time, and then sending a direct current fault processing instruction to the converter station at the other end connected with the MMC;
    (3) when the converter station at the other end receives the direct current fault processing instruction or detects that the current of its own MMC bridge arm exceeds the threshold, similarly, immediately locking all half-bridge sub-modules in the MMC and conducting all resistive sub-modules, and closing the alternating current circuit breakers $BR_1$, $BR_2$ and $BR_3$;
    (4) after a certain period of time $t_3$, when the current flowing through the mechanical switches at both ends of a fault line is reduced to a certain size, the converter stations at both ends issuing an opening signal to their respective mechanical switches, the mechanical switches complete turning on to realize a physical isolation of the fault line, and at the same time, the converter stations at both ends issuing an opening signal to the alternating current circuit breakers $BR_1$, $BR_2$ and $BR_3$ of their respective MMC;
    (5) after a certain time $t_4$, the alternating current circuit breakers $BR_1$, $BR_2$ and $BR_3$ of the MMC at both ends returning to the open state, and completing the direct current fault processing.

5. The direct current fault processing strategy according to claim 4, wherein in step (2) and step (3), it is determined that the MMC bridge arm current exceeds the threshold when the following relation holds;

$$\max(I_{pa}, I_{na}, I_{pb}, I_{nb}, I_{pc}, I_{nc}) > 2I_{rate}$$

where $I_{pa}$ is an upper arm current of phase A of the MMC, $I_{na}$ is the lower arm current of phase A of the MMC, $I_{pb}$ is an upper arm current of phase B of the MMC, $I_{nb}$ is the lower arm current of phase B of the MMC, $I_{pc}$ is an upper arm current of phase C of the MMC, $I_{nc}$ is the lower arm current of phase C of the MMC, $I_{rate}$ is rated current of IGBT in the sub-module.

6. The direct current fault processing strategy according to claim 4, wherein in step (5), a reclosing operation is required after direct current fault processing is completed, and the method further comprises:
    for a temporary direct current fault, after a certain de-ionization time, issuing a closing signal to the mechanical switches at both ends of the fault line, and at the same time, issuing an instruction to unlock the half-bridge sub-module and bypass the resistive sub-module to the MMC at both ends, so that a system can recover to a steady-state operation state;

for a permanent direct current fault, after a certain de-ionization time, issuing a closing signal to the mechanical switches at both ends of the fault line, and at the same time, issuing an instruction to unlock the half-bridge sub-module and bypass the resistive sub-module to the MMC at both ends; as it is a permanent direct current fault, if it is detected again that the bridge arm current of the MMC of a converter station at one end exceeds the threshold after a certain time, performing the direct current fault processing again according to steps (2)-(5).

7. The direct current fault processing strategy according to claim 4, wherein: when the half-bridge sub-module in the MMC is locked and the resistive sub-module is put into operation, a resistor in the resistive sub-module forms an LC oscillation attenuation loop together with the smoothing reactor, the bridge arm reactor and the direct current line, so that the direct current fault current quickly drops to the current range that the mechanical switch is capable of being turned off within t3 after the half-bridge sub-module is locked and the resistive sub-module is put into operation, and finally the mechanical switch is turned on.

8. The direct current fault processing strategy according to claim 4, wherein during the $t_3+t_4$ period of fault processing, three-phase inter-phase short circuit is actively created on a MMC valve side by closing the alternating current circuit breakers $BR_1$, $BR_2$ and $BR_3$, which prevents the current of a alternating current system from flowing into a direct current system and accelerates the process of fault current oscillation attenuation, and a total duration of $t_3+t_4$ does not exceed 60 ms.

9. A resistive sub-module hybrid modular multilevel converter (MMC) comprising:

a three-phase six-bridge arm structure, wherein each phase comprises an upper bridge arm and a lower bridge arm, wherein the upper bridge arm comprising $N_1$ half-bridge arm sub-modules, $N_2$ resistive sub-modules and a bridge arm reactor in series from a high voltage terminal to a low voltage terminal; the lower bridge arm comprising a bridge arm reactor, $N_2$ resistive sub-modules and $N_1$ half-bridge sub-modules in series from the high voltage terminal to the low voltage terminal, where $N_1$ and $N_2$ are natural numbers greater than 1, wherein the high voltage terminal of a direct current side of the MMC is connected with a direct current line through a smoothing reactor and a mechanical switch in sequence;

a middle node of the upper bridge arm and the lower bridge arm of phase A is connected with a first end of alternating current breaker $BR_1$, and a second end of the alternating current breaker $BR_1$ is grounded;

a middle node of the upper bridge arm and the lower bridge arm of phase B is connected with a first end of an alternating current breaker $BR_2$, and a second end of the alternating current breaker $BR_2$ is grounded;

a middle node of the upper bridge arm and the lower bridge arm of phase C is connected with a first end of an alternating current breaker $BR_3$, and a second end of the alternating current breaker $BR_3$ is grounded.

10. The resistive sub-module hybrid MMC according to claim 9, wherein the $N_2$ resistive sub-modules in each bridge arm is less than or equal to 30% of $N_1$.

11. The resistive sub-module hybrid MMC according to claim 9, further comprising two IGBT $T_1$-$T_2$ with anti-parallel diodes and a resistor $R_0$, wherein an emitter of the IGBT $T_1$ is connected with a collector of the IGBT $T_2$ and serves as the high voltage terminal of the sub-module, a collector of IGBT $T_1$ is connected with a first end of resistor $R_0$, and a second end of the resistor $R_0$ is connected with the emitter of the IGBT $T_2$ and serves as the low voltage terminal of the sub-module.

* * * * *